United States Patent
Wild et al.

(10) Patent No.: US 9,557,404 B1
(45) Date of Patent: Jan. 31, 2017

(54) CIRCUIT AND ANTENNA DESIGN FOR SMALL FORM FACTOR INTERNET OF THINGS DEVICES

(71) Applicant: IOTERA, INC., Redwood City, CA (US)

(72) Inventors: Ben Wild, San Mateo, CA (US); Robert A. Barton, Sunnyvale, CA (US); Ravneet Bajwa, Fremont, CA (US)

(*) Notice: Subject to any disclaimer, the term of this patent is extended or adjusted under 35 U.S.C. 154(b) by 31 days.

(21) Appl. No.: 14/732,708

(22) Filed: Jun. 6, 2015

Related U.S. Application Data (63) Continuation-in-part of application No. 14/201,897, filed on Mar. 9, 2014.

(60) Provisional application No. 61/803,655, filed on Mar. 20, 2013, provisional application No. 61/808,141, filed on Apr. 3, 2013, provisional application No. 61/494,231, filed on Mar. 6, 2014.

(51) Int. Cl.
*G08B 13/14* (2006.01)
*G01S 5/14* (2006.01)
*G01S 5/02* (2010.01)
*G01S 1/02* (2010.01)

(52) U.S. Cl.
CPC .. *G01S 5/14* (2013.01); *G01S 1/02* (2013.01); *G01S 5/0284* (2013.01)

(58) Field of Classification Search
CPC ............ G06K 19/077; G06K 19/07713; G06K 19/0772; G06K 19/07743; G06K 19/07749; G06K 19/0775; G06K 19/07773; G06K 19/0779; G08B 13/1427; G08B 13/1436; G06Q 10/08; G06Q 10/083; G06Q 10/0833; G06Q 10/087; G01S 1/00; G01S 1/02; G01S 1/70; G01S 5/0284; G01S 5/14; G01S 11/00; G01S 11/02; G01S 11/023; G01S 11/04
See application file for complete search history.

(56) References Cited

U.S. PATENT DOCUMENTS

| | | | | |
|---|---|---|---|---|
| 6,883,710 | B2* | 4/2005 | Chung | H04L 63/12 235/383 |
| 7,098,793 | B2* | 8/2006 | Chung | G06K 17/00 235/376 |
| 8,787,944 | B2* | 7/2014 | Smith | H04W 64/00 455/404.2 |
| 2006/0220851 | A1* | 10/2006 | Wisherd | G06Q 10/08 340/568.1 |
| 2012/0274470 | A1* | 11/2012 | Sandvick | G08B 5/36 340/584 |
| 2016/0127871 | A1* | 5/2016 | Smith | H04W 4/025 455/456.6 |

* cited by examiner

*Primary Examiner* — Van Trieu
(74) *Attorney, Agent, or Firm* — Ronald L. Rohde (57) ABSTRACT

A mobile device is described for tracking an object and sensing an environment of the object. The mobile device includes a circuit board that is loaded with radio frequency (RF) transmitters and receivers for finding the device position and communicating data about the device, the ambient environment of the device, and/or the position of the device. Sensor on the device may measure data about the device and about the ambient environment of the device. Flexible antennas increases the effective volume for a plurality of antennas for increased range and/or reduced power. An adjustable impedance circuit provides for real-time tuning and impedance matching of the antennas.

20 Claims, 5 Drawing Sheets

CIRCUIT AND ANTENNA DESIGN FOR SMALL FORM FACTOR INTERNET OF THINGS DEVICES

CROSS REFERENCE TO RELATED APPLICATIONS

The present application claims is a continuation in part of U.S. patent application Ser. No. 14/201,897 filed Mar. 9, 2014 and titled "DEVICE POSITIONING USING ACOUSTIC AND RADIO SIGNALS," which in turn claims priority benefit from U.S. provisional patent application No. 61/803,655 filed Mar. 20, 2013 and titled "Self-calibrating, hybrid radio-acoustic indoor positioning and mapping system," U.S. provisional patent application No. 61/808,141 filed Apr. 3, 2013 and titled "Automatic indoor mapping and planogram generation system and methods," and U.S. provisional patent application No. 61/949,231 filed Mar. 6, 2014 and titled "DEVICE POSITIONING USING ACOUSTIC AND RADIO SIGNALS;" the disclosures of all of the above applications are incorporated by reference herein in their entirety.

FIELD OF THE PRESENT TECHNOLOGY

The present technology relates generally to tracking and sensing ambient conditions about a device, and determining the device positions using radio frequency signals.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the present technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity. The term RF as used for information communication including transmission and reception of information, is intended to apply not only to radio frequency electromagnetic radiation, but also to infrared, visible light, ultraviolet, microwave, and other forms of electromagnetic radiation.

Figure 1:
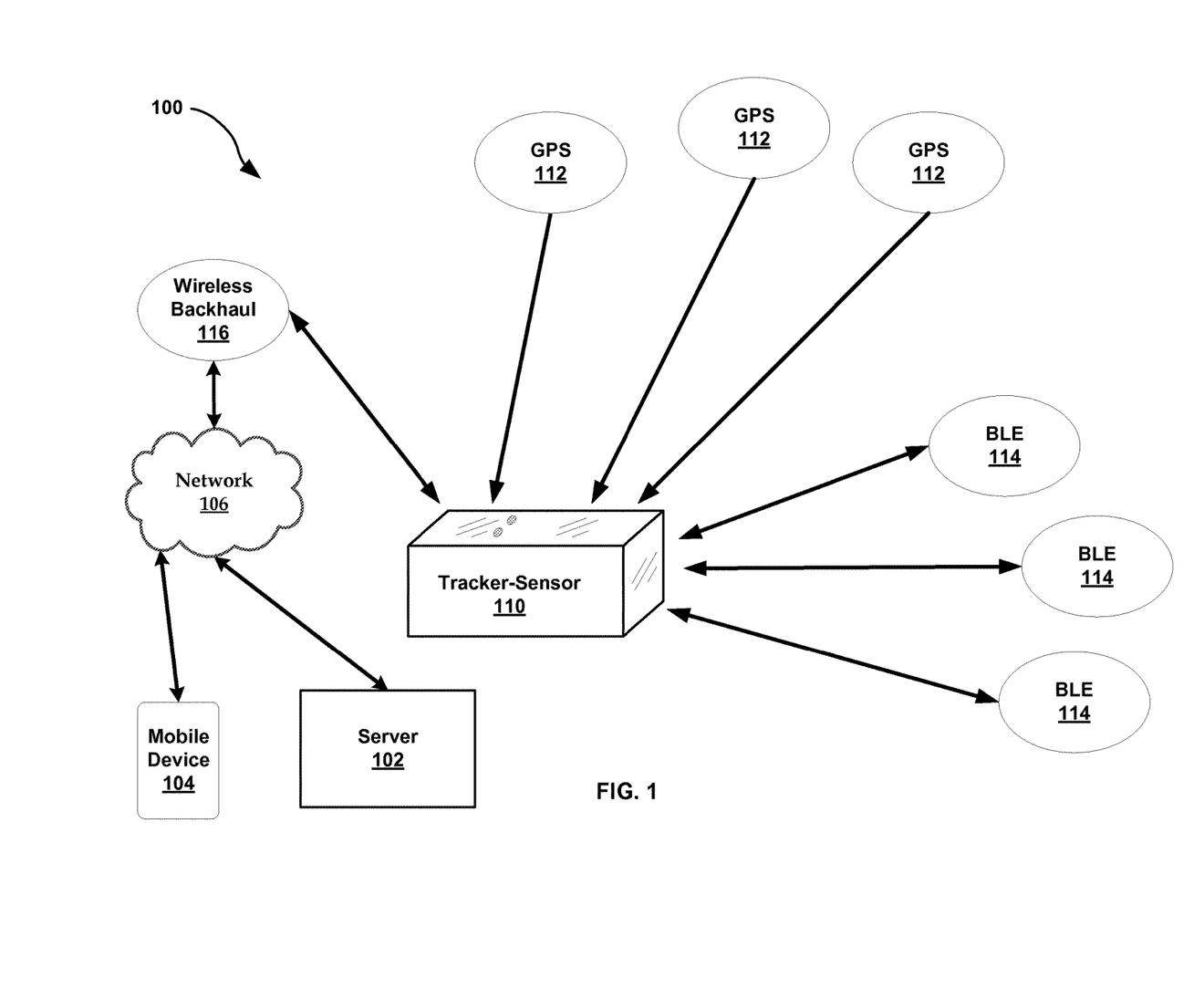
FIG. 1 is a block diagram illustrating a tracking-sensing device, in accordance with aspects of the technology.

FIG. 1 is a block diagram illustrating a tracking-sensing device 110, in accordance with aspects of the technology. The tracking-sensing device 110 may be attached to an object and used for tracking the object. In sensing applications a sensor is included inside or external to the tracking-sensing device 110. The sensor may be used for sensing the object, the environment of the tracked object, and/or conditions of the tracking-sensing device 110. In some embodiments, tracking-sensor 110 is moved from location to location and the sensor is used for gathering environmental data about the various locations, while the tracking circuitry may be used for indicating the location of the environmental data. In various embodiments, the sensor measures temperature, ambient pressure, acceleration in one, two, three, four, five, six or more axes, magnetic fields, light, audio, blood pressure, heart rate, radiation, altimeter, and/or the like. The tracking-sensor 110 may transmit the tracking data and/or sensing data to a server, e.g., server 102, in real-time In various tracking applications, the tracking-sensing device 110 obtains a location through various combinations of GPS satellite signals 112, short range radio frequency (RF) beacons, cell phone signals, and long range RF beacons. An example of a short range RF beacon technology that is gaining in popularity, typically for indoor positioning, is called Bluetooth Low Energy (BLE). FIG. 1 illustrates three BLE beacons 114. However, more or fewer BLE beacons 114 may be used for communication with the tracking-sensor 110. A typical range of a BLE beacon 114 is a 0-10 meters. BLE beacons 114 may be used for positioning and/or transferring information between the tracking-sensing device 110 and one or more of BLE 114 in communication with other tracking-sensing devices 110.

An example of a long range RF beacon technology that is used for indoor and/or outdoor positioning, is a wireless backhaul 116. FIG. 1 illustrates one wireless backhaul 116, however, more than one wireless backhaul 116 may be in communication with tracking-sensor 110. A typical range of a wireless backhaul 116 is about 100-10,000 meters. While the wireless backhaul 116 may be primarily used for transferring information between the tracker-sensing device 110 and a core network, an RF signal from the wireless backhaul 114 may be used for determining a position of the tracking-sensing device 110.

The tracking device 110 may receive tracking information from GPS satellites 112 and/or RF beacons (e.g., wireless backhaul 116 and/or BLE 114). The tracking device 110 may use the received tracking information to compute its location. In some embodiments, the tracking device 110 uses an on board processor to compute its location based on the received tracking information. Alternatively, or additionally, the tracking device 110 transmits the received tracking information to one or more server 102 via a network 106, which uses the information to calculate a position of the tracking device 110. Alternatively a server 102 is in direct communication with the wireless backhaul 116. The server may compute the location of the tracking-sensor 110. The tracking information may include location parameters and/or RF beacon information, such as a wireless backhaul ID and/or BLE ID. The location information may be transmitted through wireless backhaul 116 for transfer to the server 102 and/or a mobile device 104 (e.g., a smart phone). In various embodiments, the wireless backhaul is a 3G or 4G cellular link, Zigbee, WiFi or any other wireless technology that is suitable for connecting devices to the internet. In some embodiments, a processor on a BLE 114 receives tracking information from the tracking device 110 and uses the tracking information to calculate a position of the tracking device 110. See, e.g., U.S. patent application Ser. No. 14/201,897 filed Mar. 9, 2014 and titled "DEVICE POSITIONING USING ACOUSTIC AND RADIO SIGNALS," which is incorporated herein in its entirety.

Figure 2:
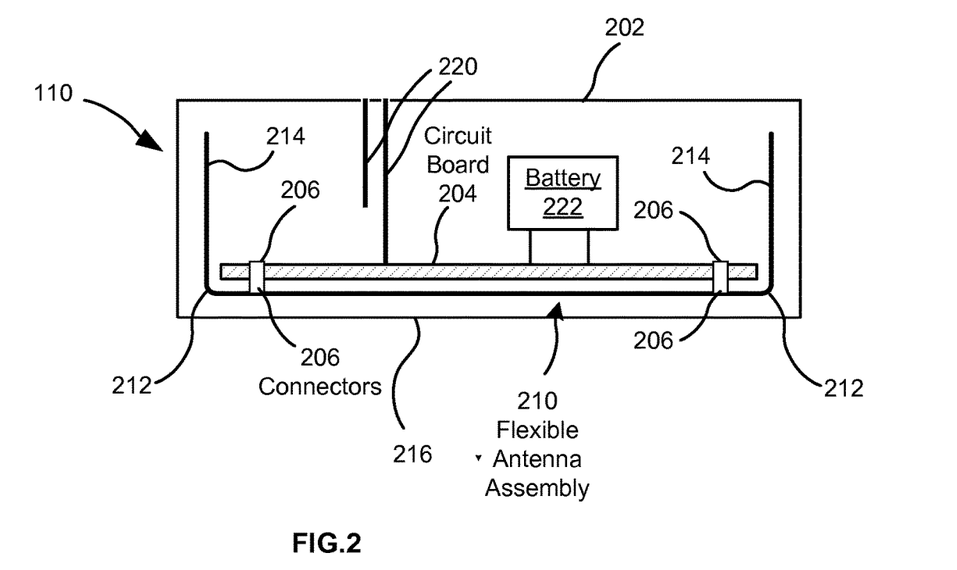
FIG. 2 illustrates an internal view of an exemplary design of the tracking-sensing device of FIG. 1.

FIG. 2 illustrates a internal view of an exemplary design of the tracking-sensing device 110 of FIG. 1. The tracking-sensing device 110 includes an enclosure 202, a circuit board 204, internal connectors 206, a flexible antenna assembly 210, a battery 222, and one or more optional external connectors 220. The enclosure 202 contains the circuit board 204, the flexible antenna assembly 210, and optionally the battery 222. The flexible antenna assembly 210 may be fabricated as a PC board using flexible material as a substrate. In some embodiments the PC board is fabricated using Polyamide, Pyralux, annealed copper and/or other flexible materials suitable for high volume manufacturing. The flexibility of the antenna assembly 210 facilitates bending folding within the enclosure 202. The flexible antenna assembly 210 of FIG. 2 includes bends 212 that may serve to reduce the size of the enclosure 202. Additionally, the bends 212 form vertical antenna sections 214 that extend above a base 216 that may define a ground plane about parallel to the circuit board 204. The antenna sections 214 may be at about right angles to the base 216. The In some embodiments, the circuit board 204 also forms a portion of the ground plane. This may serve to increase the effective volume of antennas disposed on the substrate 300 of the antenna assembly 210 within the enclosure 202. This also places sections 214 of the antenna assembly 210 outside the ground plane formed by the base 216 and/or the circuit board 204. Bending the substrate 300 to place the sections 214 of the antenna assembly 210 outside the ground plane and/or at about right angles to the ground plane increases the effective volume of the antennas 302, which may both serve to increase the radiation efficiency and increase the bandwidth of the antennas 302 on the antenna assembly 210.

Connectors 206 may be used to attach the circuit board 204 to the flexible antenna assembly 210 Metallic pads of connectors 206 may be disposed on both material supporting the flexible antenna assembly 210 and the circuit board 204. The circuit board 204 and the flexible antenna assembly 210 may soldered together using a standard reflow process or soldered by hand to connect the metallic pads of connectors 206 on the antenna assembly 210 to the metallic pads on the circuit board 204. While two connectors 206 are illustrated in FIG. 2, fewer or more connectors 206 may be used to connect the circuit board 204 and antenna assembly 210.

The external connectors 220 may be used for charging the battery 222. In some embodiments, the external connectors 220 provide hardwired communication between external devices and the circuit board 204, for providing signals to devices on the circuit board 204. While two external connectors are illustrated in FIG. 2, more or fewer external connectors 220 may be incorporated into the design of the tracking-sensor 110.

The battery 222 may be disposed internally or externally to the enclosure 202 and coupled to devices on the circuit board 204. In some embodiments, the battery 222 is disposed on the circuit board 204. In some embodiments, the tracking-sensing device 110 includes a display and/or capacitive touch pad (not illustrated) coupled to an internal processor for providing a communication interface.

Figure 3A:
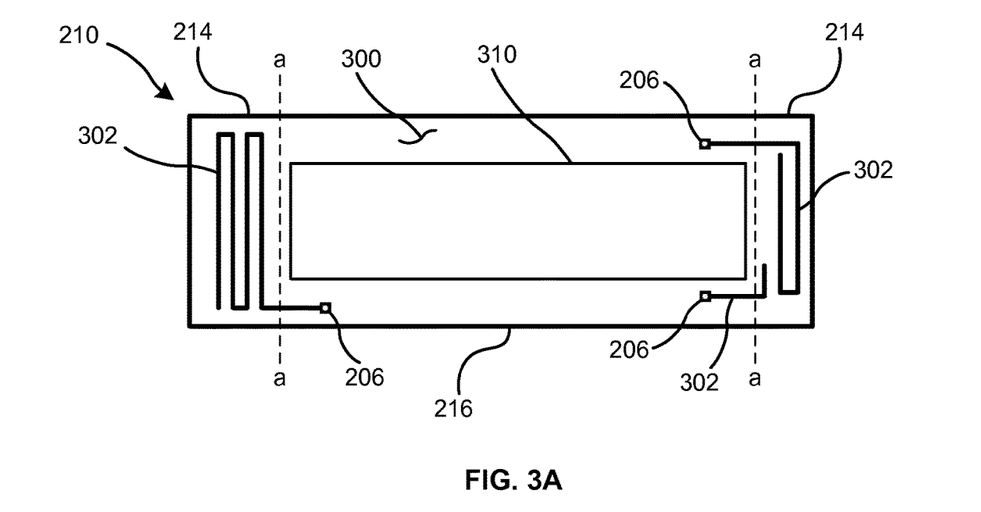
FIG. 3A is a plan view illustrating an embodiment of a flexible antenna, in accordance with aspects of the technology.
Figure 3B:
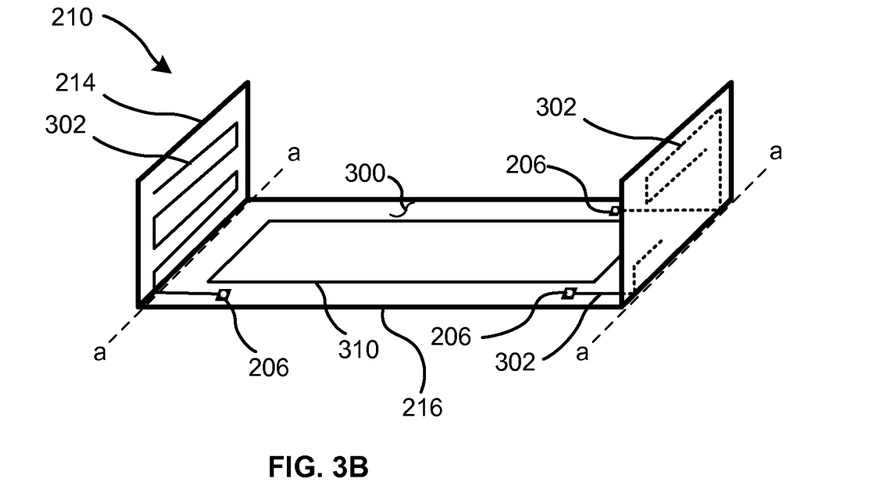
FIG. 3B is a perspective view of the flexible antenna of FIG. 3A.

FIG. 3A is a plan view illustrating an embodiment of the flexible antenna assembly 210, in accordance with aspects of the technology. FIG. 3B is a perspective view of the flexible antenna assembly 210 of FIG. 3A. The flexible antenna assembly 210 of FIGS. 3A and 3B includes a flexible substrate 300 and three antennas 302 disposed on the substrate 300. The flexible antenna assembly 210 as shown in FIG. 3A is may be fabricated in a flat configuration (without bends 212). Dotted lines a-a illustrate where the flexible substrate 300 may use a bend or fold to configure the antenna assembly 210 for installation into the enclosure 202. In some embodiments, a portion an the antenna 302 disposed on the base 216 and another portion of the antenna 302 is disposed on the vertical antenna section 214. FIG. 3B differs from FIG. 3A in that the flexible substrate 300 is illustrated as being folded or bent along dotted lines a-a to place the vertical sections 214 at about an angle to the base 216 (e.g., about a right angle) and out of the ground plane. Portions of antennas 302 are rendered in dotted line to indicate that they are obscured by the substrate 300.

The antennas 302 are configured to flex with the substrate 300 when bend upwards. The bends 212 are illustrated in FIGS. 3A and 3B as being about right angles. In some embodiments, the antennas 302 are plated onto the substrate 300 before bending the substrate 300. Examples of a flexible material for the substrate 300 include polyamide, Pyralux or annealed copper. In various embodiments, copper, silver, chrome, gold, tin, and/or other conductive or semi conductive materials are plated onto the substrate 300 to fabricate the one or more of the antennas 302. Alternatively, conductive or semi-conductive materials may be disposed on the flexible substrate 300 using other methods, e.g. conductive glues, to fabricate the one or more of the antennas 302.

The exemplary antennas 302 illustrated in FIGS. 3A and 3B include an antenna 302 for a backhaul wireless link 116, for example, configured to use the 900 MHz US unlicensed band, an antenna 302 for receiving signals from GPS devices 112, for example, configured for using the 1.575 GHz band, and an antenna 302 for indoor positioning, for example, configured to use a 2.4 GHz band such as may be used by BLE 114. The antennas 302 may be configured for receiving and/or transmitting in other bands. While three antennas 302 are illustrated in FIG. 3, more or fewer antennas 302 may be disposed on the substrate 300.

The antennas 302 of the assembly 210 of FIGS. 3A and 3B are fabricated on a flexible substrate 300. A fold or bend 212 in the substrate 300 is then used to conform shape of the antennas 302 into a configuration that improves the performance of one or more of the antennas 302 while fitting the antenna assembly 210 into a package having sizes and/or shape limitations. However, in some embodiments, the antenna assembly 210 is fabricated on a rigid substrate that includes the bends 212 illustrated and described in FIGS. 3A-3B. The substrate 300 may be fabricated using a rigid PCB having portions 214 at about right angles to a base 216.

The antenna pads 206 for soldering the antennas 302 to the main PCB are illustrated as disposed an end of each antenna 302. However, the antenna pads 206 may be connected elsewhere along the antennas 302 or at the opposite end. Optionally, an aperture 310 may be disposed in the substrate 300, e.g., for accommodating components of the circuit board 204.

Figure 3C:
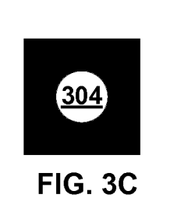
FIG. 3C is a plan view illustrating details of the antenna pad of FIGS. 2 and 3A.

FIG. 3C is a plan view illustrating details of the antenna pad 206 of FIGS. 2 and 3A. In order to improve ease in the soldering process, a through hole via 304 may be fabricated through the substrate 300 at the antenna pad 206. The via may promote flow when connecting the circuit board 204 to the flexible antenna assembly 210.

Figure 4:
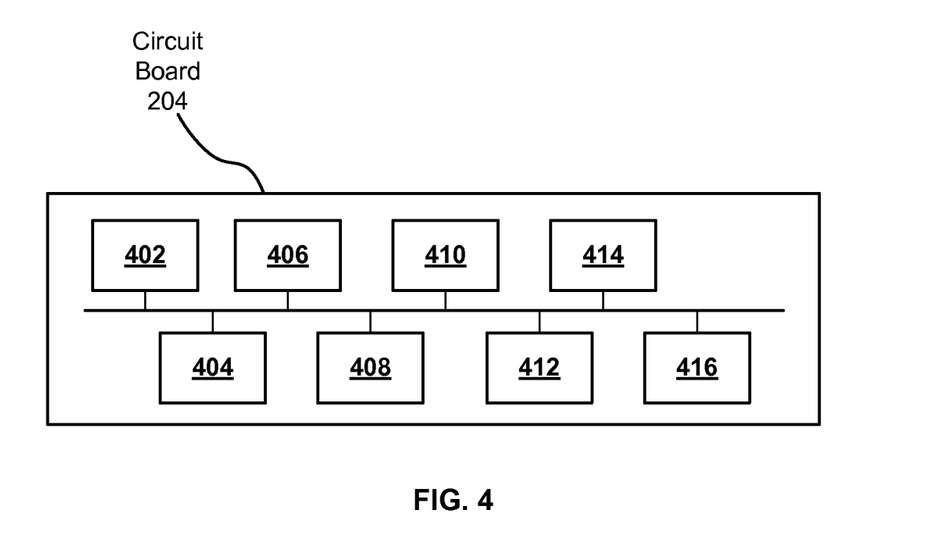
FIG. 4 is a block diagram illustrating components of a circuit board of FIG. 2.

FIG. 4 is a block diagram illustrating components of the circuit board 204. In various embodiments, the circuit board 204 is loaded with one or more processor 402, memory 404, antenna interface 406, sensor 408, power management module 412, oscillator 410, optical transceiver 414, audio speaker 416.

In various embodiments, the sensors 408 include an accelerometer, an atmospheric pressure sensor, a microphone, a speaker, an ambient light detector, an infrared detector, a temperature sensor, a gyro, a blood pressure sensor, a heart rate sensor, a pulse oximeter, an ultraviolet radiation sensor, a chromatograph, a spectrometer, a gravitational sensor, a magnetometer, an airspeed sensor, a still image camera, a video camera, a combination light source and reflected light sensor, a proximity sensor, a vacuum sensor, a gas chemical sensor, sonar components, a radiation detector, radar, and/or the like.

Accelerometers include linear accelerometers and rotational accelerometers. Linear and rotational accelerometers may be used in combination to provide for 1, 2, 3, 4, 5, 6, or more axes of acceleration information about the tracking-sensor 110. Sonar components include ultrasonic receiver, ultrasonic transceiver, ultrasonic range detector and/or the like.

The antenna interfaces 406 are configured for transmitting and/or receiving RF signals via antennas. In some embodiments, an antenna interface 406 controls the transmission frequency, frequency band, and/or phase. An antenna interface 406 may be configured to condition transmitted and/or received signals. In various embodiments, the antenna interface 406 includes an RF transmitter, an RF receiver, a processor for processing the transmitted and/or received signals, switches, oscillators, circuits for conditioning transmitted and/or received signals, GPS receivers, bluetooth transceivers, wifi transceivers, and/or the like. In some embodiments, an antenna interface 406 includes a circuit configured for optimizing a frequency used for transmitting via an antenna, as discussed elsewhere herein. Each of the antenna interfaces 406 may be coupled to one or more flexible antennas 302.

The power management module 412 may be coupled to the connectors 220 and include circuitry for conditioning power for charging the batter, as would be understood by persons having ordinary skill in the art with this disclosure before them. The power management module 412 may suspend power to one or more components on the circuit board 204 in order to conserve energy in the battery 222. In some embodiments, the power management module 412 includes a processor configured to run at minimal power while suspending and activating the components. The power manager may be controlled using the processor 402. In some embodiments, the power management module 412 is configured to adjust power used to transmit via antenna 302. The adjustment may be based on calculated signal strength. Methods of calculating and adjusting signal strength for an antenna 302 are discussed elsewhere herein.

When designing small form factor tracking-sensing devices 110 a ground plane of the antenna 302 (e.g., contributed by the circuit board 204) may be electrically small. The term electrically small generally indicates that the largest effective dimension of the ground plane is much smaller than a wavelength of an operational frequency for the antenna 302, while transmitting and/or receiving a signal in a frequency band including that operational wavelength. Typically a small ground plane begins to be a problem when the largest effective dimension is less than about a quarter wavelength of the operational wavelength. Under such conditions, radiation efficiency of the antenna 302 may be substantially less than 100%. Additionally, the bandwidth of the antenna 302 may become narrower as a result of a small ground plane. In an embodiment where a broader bandwidth is useful, a reduced bandwidth can pose a problem in terms of being able to operate efficiently over an entire range of frequencies of the desired frequency band. Furthermore, variations and real-time fluctuations in a dielectric constant of the substrate 300, circuit board 203, dielectric variation of the enclosure 202, and/or ambient conditions, may contribute additional uncertainty as to where a center frequency of the antenna 302 will be will fall within the desired frequency band. Moreover, real-time variations in proximity of the tracking-sensing devices 110 to various objects may alter effective impedance of the antenna 302. These variations in ambient conditions and object proximity cause a variation in ambient impendence of the antenna 302.

Figure 5A:
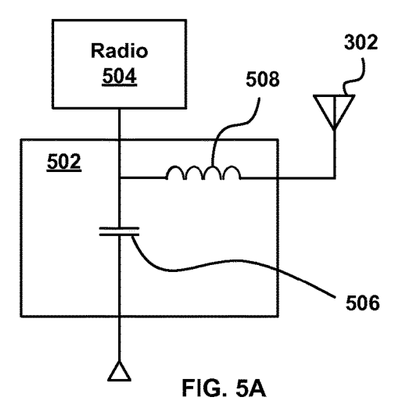
FIGS. 5A and 5B illustrate an impedance matching networks.
Figure 5B:
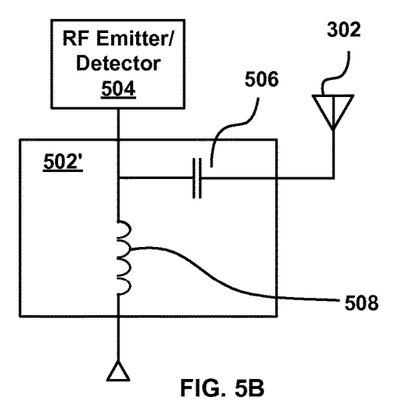

FIGS. 5A and 5B illustrate impedance matching networks 502 (502 and 502') disposed between a radio 504 and an antenna 302. The impedance matching networks 502 may be used to shift a center frequency of the antenna 302 by changing the impedance of the network 502. Impedance matching networks 502 include various arrangements of capacitors and inductors connected in series and/or parallel between the radio 504 and the antenna 302. In the example of the impedance matching network 502 of FIG. 5A, a capacitor 506 is connected to ground and the inductor 508 is connected in series between the RF emitter/detector 504 and the antenna 302. The radio 504 may be an RF emitter and/or an RF receiver. The radio 504 may be tuned to detect and/or emit an RF signal at a selected frequency over a range of frequencies. The processor 612 may select the frequency for the radio 504 to emit or detect.

The exemplary impedance matching network 502' of FIG. 5B differs from the impedance matching network 502 of FIG. 5A in that positions of the capacitor 506 and the inductor 508 are reversed such that the inductor 508 is connected to ground and the capacitor 506 is in series as shown in FIG. 5B. Multiple stages of inductors 508 and capacitors 506 (not illustrated) may also be implemented to allow for a larger frequency range over which the antenna 302 can be tuned. The impedance of the networks 502 may be adjusted by altering the capacitance (e.g., capacitor 506 in the network 502) and/or inductance (e.g., inductor 508 in the network 502'). A resistor (not illustrated) may be disposed in the impedance matching networks 502 in place of the inductor 508 to form an RC network, or in place of the capacitor 506 to form a RL network. In some embodiments a resistor is added to the impedance matching networks 502 to form an RLC tank circuit. Various configurations and values resistance, capacitance, and inductance may be used to form high pass filters, low pass filters, and band-pass filters as would be understood by persons having ordinary skill in the arts with this disclosure before them. In some embodiments, the processor 612 is a component the antenna interface 406. Alternatively, the processor 402 is used as a separate component to perform the tasks of processor 612.

Figure 6:
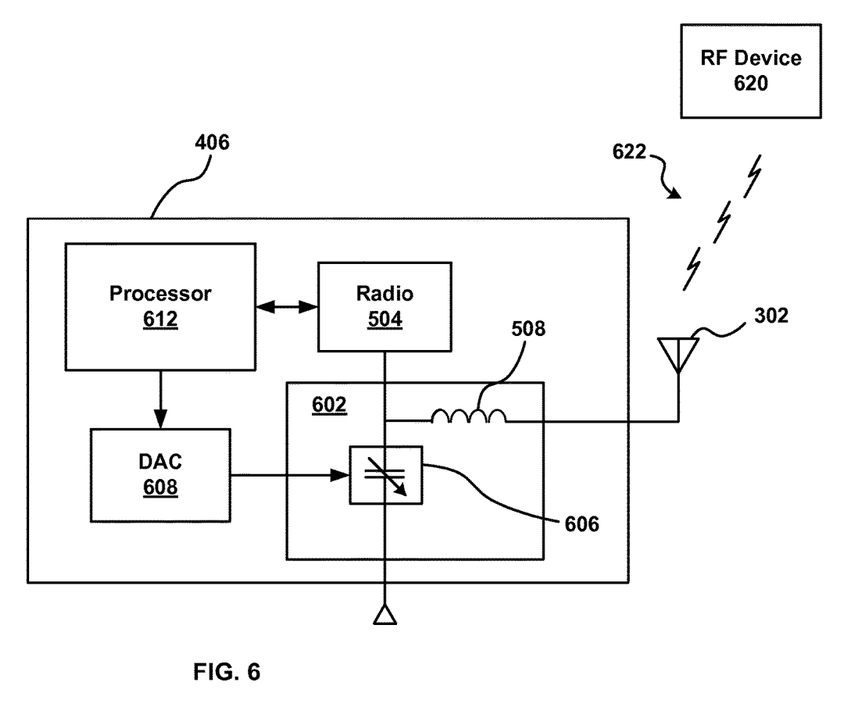
FIG. 6 illustrates an antenna interface configured for adjusting impedance matching network.

FIG. 6 illustrates an antenna interface 406 configured for adjusting an impedance matching network. FIG. 6 includes an impedance matching network 602, the radio 504, a processor 612, and a Digital to Analog Converter (DAC) 608. The impedance matching network 602 of FIG. 6 differs from the impedance matching network 502 of FIG. 5A in that a varactor 606 is substituted for the capacitor 506 of network 502. The varactor 606 functions as capacitor that is configured to change capacitance as a function of an applied voltage. Adjustment of the impedance matching network 602 may provide for and increase in radiated power at antenna 302.

In FIG. 6 the applied voltage is received from the DAC 608. The matching network 602 may shift the center frequency of the antenna 302 over a wide range, thus, compensating for narrow bandwidth. The voltage applied by varactor 606 may be tuned using the processor 612 to control the DAC 608.

The processor 612 of FIG. 6 is connected to the radio 504. The antenna 302 may receive signals, e.g., packets 622, from an RF device 620 (e.g., GPS 112, BLE 114, Wireless Backhaul 116, and/or the like). In other examples, a radio source such as an AM or FM broadcast station is used to provide RF signals. The radio 504 may report received signal strength measurements for each received packet. In order to tune the antenna 302, the radio 504 may go through a calibration phase while the device 620 repeatedly sends the packets 622 from the RF device 620 at a specific frequency. The device 620 then performs the same process for different sample frequencies within the band of interest. For each sample frequency, the processor 612 adjusts a control voltage applied by the DAC to the varactor 606 until the received signal strength of the packets 622 is maximized, as detected by the radio 504.

For each sample frequency, the processor 612 may store in a memory, a DAC value output to DAC 608 for the control voltage that was applied to the varactor 606 and produced a maximized received signal strength. The processor 612 may store the DAC values in an memory internal to the processor 612, or in the memory 404, for example. The processor 612 may also store the associated frequency with the DAC value. During normal operation, the processor 612 may use the stored DAC value to adjust the impedance matching network 602 for each operating frequency, as the received frequency is varied. Since the impedance of the antenna 302 may change as the proximity of objects (e.g., device 620) to the antenna 302 varies, a set of frequencies and maximizing DAC values may be determined repeatedly, in real-time. Further, a proximity map of frequencies and associated DAC values may be constructed. The map may be used to predict DAC values for a frequency as proximity changes. In some embodiments, a proximity or position of the tracking-sensor 110 may be calculated from the proximity map and a measured set of DAC values.

One or more of the components of the antenna interface 406 may be disposed on the circuit board 204, or integrated into a device or separate circuit board that is coupled to the circuit board 204. For example, the processor 402 may be used for performing the tasks described for the processor 612. In another example, the radio 504 may be a GPS receiver disposed on the circuit board 204 and coupled to the antenna interface 406.

Figure 7:
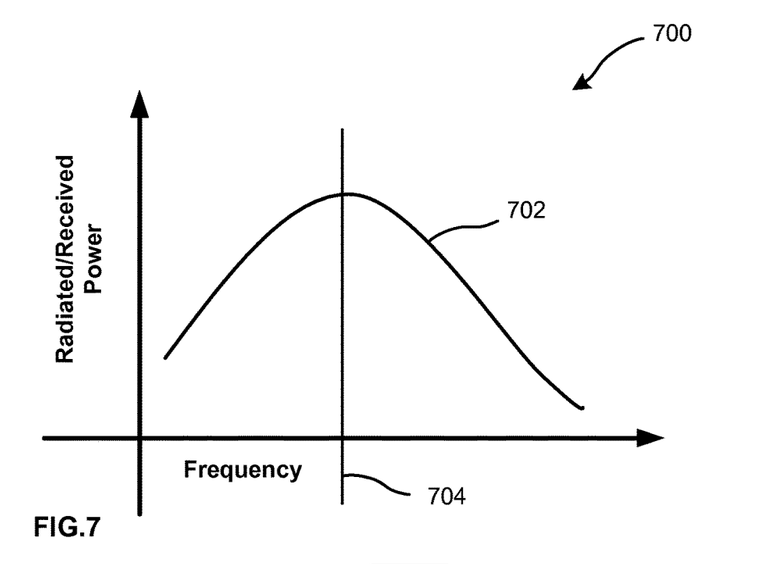
FIG. 7 is a graph of an exemplary curve illustrating radiated power as a function of frequency.

FIG. 7 is a graph 700 of an exemplary curve 702 illustrating radiated power as a function of frequency. The horizontal axis represents frequency. The vertical axis represents radiated power emitted and/or detected at the radio 504. The curve 702 may represent a power transfer curve, e.g. from data collected by the processor 612 using the radio 504. The radio 504 may detect amplitude data transferred by the network 602 from the antenna 302 for each of a plurality of frequencies of RF signals. The processor 612 may receive amplitude data from the radio 504 for each of the frequencies.

A center frequency 704 indicates a frequency at which maximum power is transferred by the combination of the antenna 302 and impedance matching network 602. The center frequency 704 of the antenna 302/network 602 combination may be shifted by adjusting the capacitance using the varactor 606 and DAC 608 to shift the impedance of the network 602. For simplicity, only adjustments of the capacitance in the matching network 602 are described. However, without loss of generality a similar adjustment of the inductor 508 may be used in alternative embodiments to shift impedance of the network 602.

In some embodiments, a pilot beacon 622 from RF device 620, (e.g., a base station) is transmitted to the tracking-sensor 110 and received at the antenna 302. The radio 504 may be controlled by the processor 612 to detect multiple frequencies. The detected amplitude at each frequency may be received by the processor 612 and used for determining the max frequency (frequency of maximum radiated power) and the amount of power radiated at the max frequency.

In some embodiments, ambient background noise in the environment is used instead of the pilot beacon 622. In various frequency bands, (e.g., unlicensed frequency bands) a noise level at the receiver is dominated by background noise being generated by devices in the environment rather than local thermal noise. In some embodiments, the tracking-sensor 110 uses the background noise as an input for adjusting the capacitance of the network 602. For example, the center frequency of the antenna 302 is adjusted using the DAC 608 to set the varactor 606 capacitance. The processor 612 then uses the radio 504 to measure background noise level received at the antenna 302 for a target frequency. The center frequency of the antenna 302 is quickly adjusted using the network 602 and the background noise is measured again using the radio 504. An increase in background noise level indicates that the antenna center frequency 704 is approaching the target frequency measured at the radio 504. In some embodiments a single target frequency is measured using the radio 504. Alternatively, the processor 612 uses multiple target frequency measurements received from the radio 504 to determine maximum power transfer.

In some embodiments, the power management module 412 uses the a calculated signal strength, power radiated and/or the maximum power transfer, e.g., as determined above, to adjust an amount of power used for transmitting information and signals. Thus, a useful life of the battery 222 may be extended. Similarly, the power management module 412 uses the calculated received signal strength and/or the maximum power transfer to adjust an amount of power used for detecting and receiving information and signals transmitted from external devices. For example, the power management module 412 ma adjust then gain of a receiver amplifier based on calculated power transfer and impedance matching, as described above.

It may be assumed that background noise does not vary significantly between two consecutive noise measurements collected over a short period of time, e.g., a few micro seconds to a few milliseconds or even a few seconds. The processor 612 and radio 504 may be configured to perform consecutive adjustments of the center frequency and measurements of background noise level very rapidly. This assumption may be verified by performing rapid multiple background noise measurements without adjusting the capacitance of the varactor 606, to verify that the background noise levels remain relatively constant.

Figure 8:
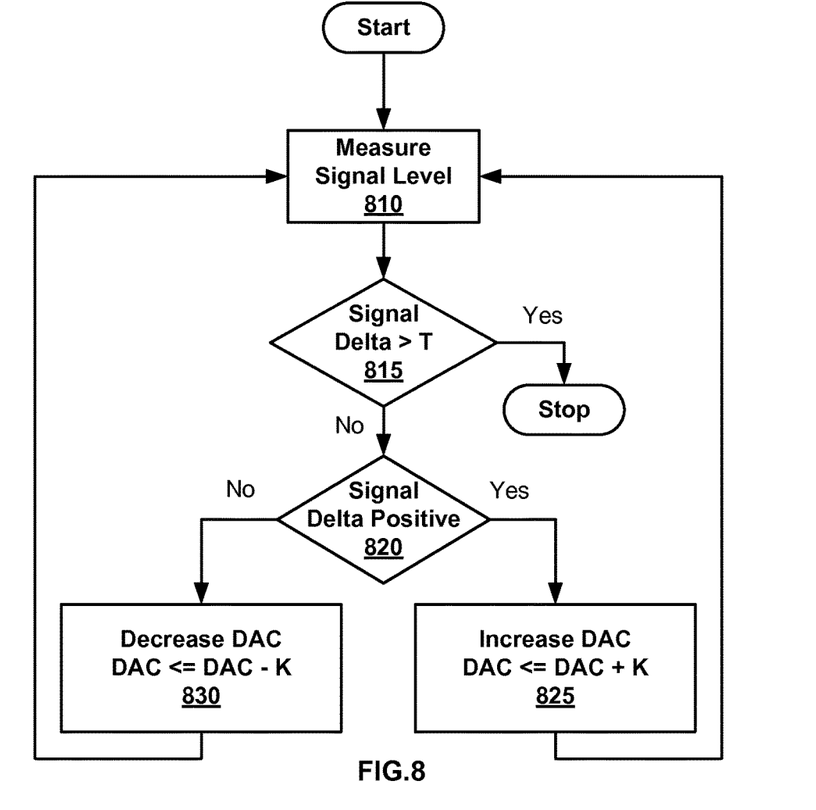
FIG. 8 is a flow chart illustrating an adjustment algorithm for tuning impedance, in accordance with aspects of the technology.

FIG. 8 illustrates a flow chart of an adjustment algorithm for tuning impedance, in accordance with aspects of the technology. A signal may be received at the antenna 302. A source of the signal may be background noise. In some embodiments, the source of the signal is the pilot beacons 622 from RF device 620.

A step size K and threshold T may be selected. The step size K may be used as an adjustment increment. An impedance value may be selected. For example, the processor 612 may output a selected impedance value to the DAC 608, which applies a voltage to the varactor 606, thus, adjusting the impedance of the impedance matching network 602.

At step 810, a signal level for a target frequency is measured using the radio 504. In various embodiments, the signal level is an amplitude for a target frequency. Alternatively, the signal level is an amplitude for a plurality of frequencies that may include the target frequency. The plurality amplitudes and respective frequencies may be used to calculate an expected amplitude for the target frequency and/or a central frequency 704. For example, the plurality amplitudes and respective frequencies may be interpolated or extrapolated to determine an expected amplitude at the target frequency. In some embodiments, the plurality amplitudes and respective frequencies may be used as data points to determine coefficients for a 2nd, 3rd, 4th, or n degree polynomial. The polynomial may be evaluated to determine an expected maximum (or minimum) and associated amplitude, e.g., the central frequency 704 and amplitude of the curve 702 at the central frequency 704.

At step 815 the amplitude(s) measured at step 810 are compared with previously measured amplitudes measured at a different impedance (e.g., at a different DAC setting). A signal delta may be determined based on the comparison. If the signal delta is greater than a threshold T, then the method continues to step 820. If the signal delta is less than the threshold T then the method may stop.

At step 820, it is determined if the signal delta is positive or negative. If the signal delta is positive, the method proceeds to step 825. If the signal delta is negative, the method proceeds to step 830.

At step 825, the DAC is increased by an increment K and the method returns to step 810. At the step 830 the DAC is decreased by an increment K and the method returns to step 810.

The increment K may be a constant. Alternatively, the increment K may be a function of various parameters, including the signal delta, as would be understood by persons having ordinary skill in feedback loops and servo system arts, with the disclosure of this application before them. For example, as the signal delta increases and/or decreases, the increment K may be scaled. In another example, the increment K may be determined using Proportional, Integral, Differential (PID) feedback arts as would be understood by persons having ordinary skill in feedback loops and servo system arts, with the disclosure of this application before them.

When the antenna power transfer curve 702 is convex down, the algorithm will tend to converge at a DAC value for a center antenna frequency 704 that is about equal to the target frequency. In some embodiments, the scaling factor is randomized to avoid local maximums if the antenna power transfer pattern is not convex down.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

The invention claimed is:

1. A mobile device comprising:
an enclosure configured for transportation;
a plurality of flexible antennas,
a flexible substrate configured to support the flexible antennas, a first portion of the flexible antenna configured to support a first portion of the flexible antennas about parallel to a ground plane, a second portion of the substrate folded relative to the first portion of the substrate to support a portion of each of the parallel antennas in a plane at an angle to the ground plane;
a circuit board disposed within the enclosure along the ground plane;
a plurality of radio frequency (RF) interfaces disposed on the circuit board, a first flexible antenna coupled via a first RF interface to a position RF receiver configured to receive position signals, and a second flexible antenna coupled via a second RF interface to a communication transceiver configured to transfer information to and from an external device; and
a processor disposed on the circuit board and configured to receive a position request from the external device, calculate a position based on received position signals, and transmit the calculated position to the external device.

2. The mobile device of claim 1, further comprising a sensor configured to measure an ambient condition at the calculated position, the processor further configured to communicate the ambient condition measurement with calculated position information to the external device.

3. The mobile device of claim 1, wherein the first RF interface includes an impedance adjustment circuit controlled by the processor for repeatedly calculating ambient impedance of the first antenna and adjusting the impedance circuit to match the calculated ambient impedance while the position of the mobile device changes during transportation of the enclosure.

4. The mobile device of claim 3, wherein the processor is further configured to calculate a distance between the mobile device and the external device based on calculated ambient impedance of the first antenna.

5. The mobile device of claim 1, wherein the processor is further configured to calculate a distance of the mobile device from the external device based on time of flight for an RF signal between the mobile device and the external device.

6. The mobile device of claim 1, further comprising an audio sensor, the processor further configured to calculate a distance between the mobile device and the external device based on a time of flight of an audio signal from the external device to the mobile device.

7. A mobile device comprising:
a circuit board disposed within the mobile device;
a first and second radio frequency (RF) interface disposed on the circuit board, each RF interface including an adjustable impedance circuit;
a flexible positioning antenna and coupled via a first RF interface to a position RF receiver configured to receive position signals, a first portion of the flexible positioning antenna about parallel to a ground plane, a second portion of the flexible positioning antenna at about a right angle to the ground plane;
a flexible communication antenna coupled via a second RF interface to a communication transceiver configured to transfer information to an external device, a first portion of the flexible communication antenna about parallel to the ground plane, a second portion of the flexible communication antenna at about a right angle to the ground plane; and
a processor configured to:
repeatedly calculate a signal strength of the flexible positioning antenna and adjust the impedance circuit in the first RF interface to while the mobile device is in motion, and
repeatedly calculate a signal strength of the flexible communication antenna and adjust the impedance circuit in the second RF interface to while the mobile device is in motion.

8. The mobile device of claim 7, wherein the processor uses the adjustable impedance circuit in the first RF interface to calculate the signal strength of the flexible positioning antenna.

9. The mobile device of claim 8, wherein the processor uses the adjustable impedance circuit in the second RF interface to calculate the signal strength of the flexible communication antenna.

10. The mobile device of claim 7, wherein the processor is further configured to receive a position request from the external device via the flexible communication antenna, calculate a position based on received position signals via the flexible positioning antenna, and transmit the calculated position to the external device via the flexible communication antenna.

11. The mobile device of claim 7, further comprising a sensor disposed in the mobile device, the sensor configured to measure an ambient condition of the mobile device.

12. The mobile device of claim 11, wherein the processor is further configured to:
receive a request to report both a position and an ambient condition of the mobile device, the request received from the external device via the flexible communication antenna,
calculate a position based on position signals received via the flexible positioning antenna,
measure the requested ambient condition using the sensor, and
transmit the calculated position and measured ambient condition to the external device via the flexible communication antenna.

13. The mobile device of claim 11, wherein the processor is further configured to:
repeatedly measure an ambient condition in real-time using the sensor while the mobile device is in motion, and
repeatedly adjust the impedance circuit in the first RF interface or second RF interface in real-time based on the measurements of the ambient condition.

14. The mobile device of claim 13, wherein sensor is an atmospheric pressure sensor, a humidity sensor, temperature a proximity sensor, a microphone, a vacuum sensor, an altitude sensor, or a temperature sensor.

15. The mobile device of claim 11, wherein the sensor includes an array of sensors capable of measuring atmospheric pressure, temperature, humidity, a proximity, sound, vacuum, altitude, and temperature.

16. A method comprising:
receiving a request at a processor from a communication transceiver disposed on a circuit board within a mobile device that is in motion, the request received from an external device via a first radio frequency (RF) interface coupled to a flexible communication antenna, a first portion of the flexible communication antenna about parallel to a ground plane, a second portion of the flexible communication antenna outside the ground plane and at a substantial angle to the ground plane, the request being for a position of the mobile device;
receiving position information at the processor from a position RF receiver disposed on the circuit board, the position information received from a satellite via a flexible positioning antenna and coupled to the processor via a second RF interface and the position RF receiver, a first portion of the flexible positioning antenna about parallel to the ground plane, a second portion of the flexible positioning antenna outside the ground plane and at a substantial angle to the ground plane;
calculating a position of the mobile device based on the received position information;
repeatedly calculating an impedance of the flexible communication antenna while the mobile device is in motion, the calculation based on ambient RF noise measured while adjusting impedance of the first RF interface using an adjustable impedance circuit in the first RF interface;
adjusting the impedance of the first RF interface using the adjustable impedance circuit to improve the signal strength, and
transmitting the calculated position of the mobile device to the external device via the first RF interface and flexible communication antenna after adjusting the impedance of the first RF interface.

17. The method of claim 16, further comprising reducing power used for transmitting the calculated position based on the calculated signal strength.

18. The method of claim 16, wherein repeatedly calculating an impedance of the flexible communication antenna comprises:
measuring a first signal level for a target frequency at a first impedance of the first RF interface;

increasing impedance of the first RF interface to a second impedance using the adjustable impedance circuit in the first RF interface;

measuring a second signal level for a target frequency at the second impedance;

comparing the first and second measured signal level;

if first measured signal level is greater than the second signal level, increasing the second impedance of the first RF interface using the adjustable impedance circuit;

if first measured signal level is less than the second signal level, decreasing the first impedance of the first RF interface using the adjustable impedance circuit.

19. The method of claim 18, wherein the adjustable impedance circuit includes a digital to analog converter (DAC) coupled to the processor and a varactor coupled to the DAC.

20. The method of claim 16 further comprising repeatedly calculating an impedance of the first interface for a target frequency, the calculation comprising:

measuring data for a first and second impedance of the first RF interface, the data including a plurality of frequencies and corresponding signal levels for each of the first and second impedance;

calculating a first and second center frequency based on the measured data;

calculating a first and second delta between the target frequency and the respective first and second center frequency; and adjusting the impedance of the first RF interface based on the first and second calculated deltas.

* * * * *